Jan. 30, 1945.   H. B. DENMAN   2,368,118
GASKET MATERIAL
Filed Jan. 6, 1943

Inventor:

Harry B. Denman,

By Cushman Darby & Cushman
Attorneys.

Patented Jan. 30, 1945

2,368,118

UNITED STATES PATENT OFFICE 2,368,118

GASKET MATERIAL

Harry B. Denman, Detroit, Mich., assignor to Detroit Gasket & Manufacturing Company, Detroit, Mich., a corporation of Michigan Application January 6, 1943, Serial No. 471,497

5 Claims. (Cl. 288—34)

The present invention relates to a compressible, thermoplastic sealing or gasket material which is a satisfactory substitute for rubber and constitutes a substantial improvement over the same for sealing and other purposes.

The primary object of the invention is to provide a composition which may be prepared by milling as in a "Banbury" mixer and sheeted after the manner of rubber, or extruded. From the sheeted or extruded products, there may be readily formed jar and closure seals, as well as gaskets for general application, having any desired flange width and edge thickness.

An equally important object of the invention is to produce a sealing composition which is compressible, flexible and plastic but also is firm or semi-rigid in that it does not flow laterally under compression at normal or elevated temperatures in a manner to impair the seal and allow leakage to occur. Thus, under pressure at normal temperature and, more so, under heat and pressure, the sealing material readily conforms to the joint surfaces and the conforming seal or fit is resiliently maintained at all times as distinguished from a weak, free-flowing plastic composition.

Another object of the invention is to provide a composition including constituents which contribute the compressibility and plastic characteristics and constituents which cooperate to raise the softening point and tensile strength, whereby when compressed, the composition is prevented from unrestrained flow laterally, but on the contrary is resilient and self-sustaining.

An additional object of the invention is to provide a sealing material which may be economically produced and which will afford a seal having a longer life than rubber compounded products.

In the accompanying drawing, I have illustrated several embodiments of the invention, and it is to be understood that the sealing material may be produced in any shape or size necessary for various types of closure seals and gaskets.

Referring to the drawing.

Figure 1:
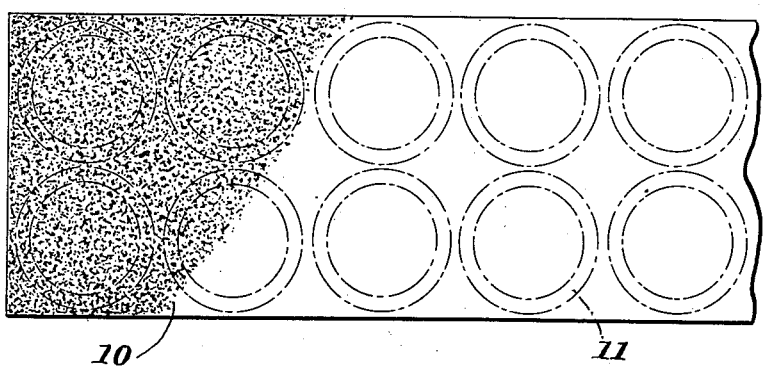
Figure 1 is a plan view of a sheet of the sealing material.

The sealing material in accordance with this invention is prepared by mixing together a petroleum resin, e. g., blown, plasticized, paraffin base oil asphalt as prepared by the Kendall Oil Company with a rubbery constituent such as processed vegetable oil preferably vulcanized corn oil as sold by the Stamford Rubber Supply Company of Stamford, Connecticut, and a mineral resin such as gilsonite. These three constituents are mixed together in the usual rubber mill or "Banbury."

The blown asphalt imparts to the vulcanized vegetable oil a sheeting quality characteristic of milled rubber and not obtainable with the vulcanized corn oil alone because the latter is of a crumbly character and not susceptible of satisfactory sheeting. The blown asphalt and vulcanized oil provide desirable compressibility and plastic properties of the composition.

The gilsonite imparts hardness to the material, i. e., raises the softening point of the thermoplastic final product. The combination of the petroleum resin and the vulcanized vegetable oil forms a weak free flowing plastic mass too soft and with too little resistance to pressure at normal temperature. The presence of the gilsonite assures that the material when subjected to pressure will not flow laterally unrestrained at normal temperatures.

After the three materials above mentioned have been suitably blended in the Banbury or other mill, there is added successively or simultaneously a filler or fibres such as short asbestos fibres (grade 3–b), a wax such as paraffin wax and a pigment such as red iron oxide or "Titanox" or a mixture of the two. Instead of such a pigment there may be included an absorbent-pigment for deodorizing the sealing material of which charcoal in finely divided form has been found highly successful. The fibres, wax and color are milled into the batch until all three have been thoroughly incorporated. As will be appreciated, the inclusion of the pigment is optional.

The purpose of the mineral filler is to resist lateral flow and particularly by increasing the tensile strength of the composition. The gilsonite, as stated above, resists flow under normal temperature, but does not impart in itself sufficient tensile strength. In other words, the gilsonite increases the softening point whereas the mineral filler resists flow because of the tensile strength imparted by the mechanical interlocking of the fibres in the mixture and is particularly effective under pressure at elevated temperatures.

The wax imparts a slippery surface which is useful during calendering or extruding and assists in the blending of the other materials during the milling. In the final product, the wax blooms at the surface, thereby preventing objectionable sticking of the sealing material, for instance, to the lip of a container.

By compounding materials having characteristics above described and in suitable amounts, a sealing material is produced which is an effective substitute for rubber and possesses improved properties thereover. The material of the present invention, as stated, is thermoplastic, highly compressible, and possesses tensile strength and resistance to flow under pressure at normal and elevated temperatures. Therefore, whether used in association with a closure or as a gasket generally, it precludes leakage by providing a tight resilient seal having a long life.

The following is a preferred example which has been found to possess highly acceptable attributes for sealing purposes.

Example

|  | Percent |
|---|---|
| Petroleum resin | about 10 to 20 |
| Processed vegetable oil (probably absolute minimum) | about 15 to 50 |
| Mineral resin | about 10 to 25 |
| Mineral fibre | about 25 to 50 |
| Wax | about 1 to 8 |

In addition, if desired, colors or pigments may be incorporated in amount up to about 10% and where a finely divided absorbent-pigment such as charcoal is used, this may be employed in amount up to about 15% and has the additional function of deodorizing the sealing compound.

Figure 2:
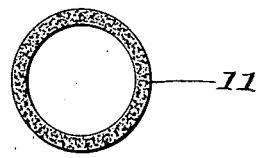
Figure 2 is a plan view of a jar ring formed from the sheet material.

After the constituents of the mixture have been suitably incorporated and blended, the composition is sheeted or slabbed from the mill in the usual manner of rubber and calendered, or it may be extruded. A sheet of the material is indicated in Figure 1 at 10 from which may be cut gaskets of any suitable shape and size, for instance, "Mason jar rings," as illustrated in Figure 2 at 11. The sheet may be of any desired thickness to control the thickness of the gasket or ring.

Figure 3:
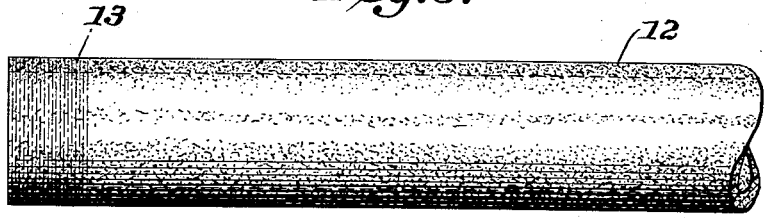
Figure 3 is an elevation of a tube of the sealing material which has been extruded and from which gaskets of any required flange width and edge thickness may be cut.

As an example of an extruded product made from the sealing composition, reference is had to Figure 3 wherein the tube 12 is extruded and the thickness of the same will correspond to the desired flange width. From this tube may be severed gaskets or rings 13 of any desired edge thickness, similar, for example, to the rings 11.

Figure 4:
Figure 4 is a sectional view showing the sealing compound applied to a backing of paper, metal, synthetic resin or other material to form a laminated structure.

In some cases, it is desirable to provide a laminated product including the sealing material of this invention as shown in Figure 4 wherein the numeral 14 indicates a backing of paper, metal or synthetic resin upon which is disposed a layer of any suitable thickness 15 of the material of this invention.

I claim:

1. A sealing material comprising blown plasticized paraffin base oil asphalt about 10 to 20%, vulcanized corn oil about 15 to 50%, gilsonite about 10 to 25%, short asbestos fibres about 25 to 50%, and paraffin wax about 1 to 8%.

2. A closure seal or gasket prepared from a material comprising blown plasticized paraffin base oil asphalt about 10 to 20%, vulcanized corn oil about 15 to 50%, gilsonite about 10 to 25%, short asbestos fibres about 25 to 50%, and paraffin wax about 1 to 8%.

3. A jar ring prepared from a sealing material comprising blown plasticized paraffin base oil asphalt about 10 to 20%, vulcanized corn oil about 15 to 50%, gilsonite about 10 to 25%, short asbestos fibres about 25 to 50%, and paraffin wax about 1 to 8%.

4. A sealing material comprising blown plasticized paraffin base oil asphalt about 10 to 20%, vulcanized corn oil about 15 to 50%, gilsonite about 10 to 25%, short asbestos fibres about 25 to 50%, and paraffin wax about 1 to 8% and pigment up to about 15%.

5. A sealing material comprising blown plasticized paraffin base oil asphalt about 10 to 20%, vulcanized corn oil about 15 to 50%, gilsonite about 10 to 25%, short asbestos fibres about 25 to 50%, and paraffin wax about 1 to 8%, and an absorbent material for deodorizing the composition up to about 15%.

HARRY B. DENMAN.